(No Model.)
N. S. BURCH.
SEED DROPPING MECHANISM FOR PLANTERS.
No. 514,411. Patented Feb. 6, 1894.
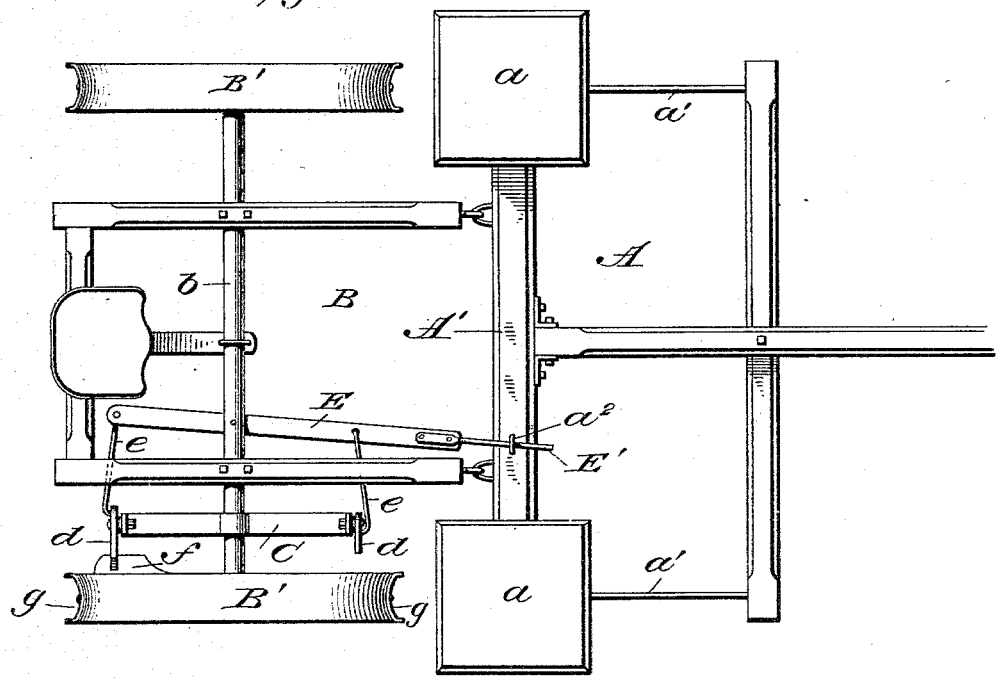
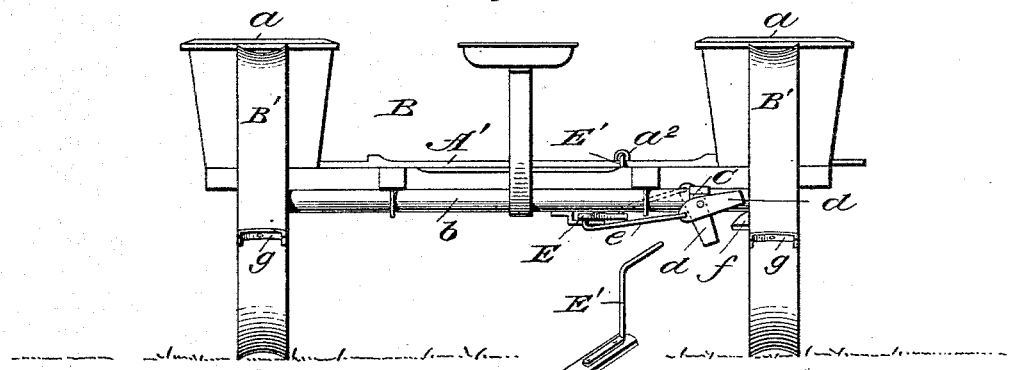
WITNESSES
L. S. Elliott,
E. W. Johnson
Nicholas S. Burch
INVENTOR
by
Attorney

UNITED STATES PATENT OFFICE.

NICHOLAS S. BURCH, OF HAYS CITY, KANSAS.

SEED-DROPPING MECHANISM FOR PLANTERS.

SPECIFICATION forming part of Letters Patent No. 514,411, dated February 6, 1894.

Application filed October 26, 1893. Serial No. 489,199. (No model.)

*To all whom it may concern:*

Be it known that I, NICHOLAS S. BURCH, a citizen of the United States of America, residing at Hays City, in the county of Ellis and State of Kansas, have invented certain new and useful Improvements in Seed-Dropping Mechanism for Corn-Planters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide an improved mechanism for actuating the seed slide from one of the supporting and covering wheels; and it consists in providing the planter frame with an oscillating lever which is connected to a pair of arms which are adapted to be struck by a projection formed on one of the supporting wheels, the oscillating lever being connected to the seed slide whereby as the supporting wheel turns the projection formed thereon will strike one of the arms to move the oscillating lever in one direction and place the other arm in position to be struck by the same projection on the wheel, as will be hereinafter fully set forth, and particularly pointed out in the claims.

In the accompanying drawings, forming part of this specification, Figure 1 is a plan view showing my improvements applied to a planter. Fig. 2 is a rear elevation of Fig. 1, and Fig. 3 is a detail perspective view.

A designates the runner frame of the planter which is provided with seed boxes $a$ $a$, runners $a'$ $a'$ and a reciprocating seed-slide A′, said seed-slide having a staple $a^2$ with which the forward end of the oscillating lever E pivoted to the wheel frame engages.

B designates the wheel frame which may be of any suitable construction, the covering wheels B′ of the same being loosely mounted on the axle $b$. To the axle is rigidly secured a cross-bar C to the upturned ends of which are pivoted arms $d$, said arms being connected by rods $e$ to the oscillating lever E, which may also be pivoted to the axle. The longer end of each arm $d$ is adapted to be engaged by a projection $f$ formed on one of the spokes of one of the supporting wheels B′, and it will be noted that the connecting-rods $e$ $e$ are held in engagement with the arms so that when one is positioned horizontally the other will be upwardly or downwardly inclined, the horizontal arm being in position to be operated upon by the projection carried by the supporting or covering wheel and oscillate the lever. The forward end of the oscillating lever has a projecting bar E′ which engages with the staple or loop $a^2$ on the seed slide. By this arrangement it is only necessary to provide the covering wheel with a single projection, and the construction of the parts is simple and can be readily applied to such corn planters as are adapted to be operated by hand.

The wheels B′ of the planter have attached to the rims thereof, at suitable intervals, projecting pieces $g$ which mark the ground where the seed has been planted, and these marks enable the operator to note the location of the hills. The markers or projections are made of a single piece of metal and bolted to the wheel, their ends being bent outwardly as shown.

I am aware that prior to my invention it has been proposed to provide the wheel frame of a planter with a bar journaled alongside of the frame, said bar carrying projections so that it will be oscillated in its bearings to reciprocate a seed-slide connected to the upturned end of the bar by a link, and I do not claim such construction as my invention.

What I claim as new, and desire to secure by Letters Patent, is—

1. In a planter, the combination, of a runner and wheel frame connected to each other, the runner frame carrying a reciprocating seed-slide, of a bar C mounted on the wheel-frame and provided at its ends with arms $d$ $d$, rods connecting said arms to an oscillating lever E which engages with the seed-slide, and a projection carried by one of the supporting wheels for engagement with the pivoted arms, substantially as shown, and for the purpose set forth.

2. In a planter constructed substantially as shown, the combination, of a rigid bar having upturned ends with arms pivoted thereto, rods connected to said arms and to an oscillating lever which engages with the seed slide, substantially as shown, whereby when one of the pivoted levers is moved out of a horizontal position the other lever will be moved to a horizontal position in the path of a projection carried by one of the supporting wheels, for the purpose set forth.

In testimony whereof I affix my signature in presence of two witnesses.

NICHOLAS S. BURCH.

Witnesses:
JOHN G. TRACEY,
JOHN SCHLYER.